United States Patent
Woodsum

(10) Patent No.: US 9,531,431 B2
(45) Date of Patent: Dec. 27, 2016

(54) DEVICES AND METHODS EMPLOYING HERMETIC TRANSFORMS FOR ENCODING AND DECODING DIGITAL INFORMATION IN SPREAD-SPECTRUM COMMUNICATIONS SYSTEMS

(71) Applicant: Hobbit Wave, Inc., Weston, MA (US)

(72) Inventor: Harvey C. Woodsum, Bedford, NH (US)

(73) Assignee: Hobbit Wave, Inc., Weston, MA (US)

( * ) Notice: Subject to any disclaimer, the term of this patent is extended or adjusted under 35 U.S.C. 154(b) by 0 days.

(21) Appl. No.: 14/522,774

(22) Filed: Oct. 24, 2014

(65) Prior Publication Data

US 2015/0117497 A1    Apr. 30, 2015

Related U.S. Application Data

(60) Provisional application No. 61/895,577, filed on Oct. 25, 2013.

(51) Int. Cl.
| | | |
|---|---|---|
| H04B 1/707 | (2011.01) | |
| H04B 1/7093 | (2011.01) | |
| H04B 1/7095 | (2011.01) | |
| H04B 1/7103 | (2011.01) | |

(52) U.S. Cl.
CPC ............ *H04B 1/7095* (2013.01); *H04B 1/707* (2013.01); *H04B 1/7093* (2013.01); *H04B 1/7103* (2013.01)

(58) Field of Classification Search
CPC ....... H04B 1/707; H04B 1/709; H04B 1/7093; H04B 1/7095

USPC ......................................... 375/141, 146, 147
See application file for complete search history.

(56) References Cited

U.S. PATENT DOCUMENTS

| | | | |
|---|---|---|---|
| 4,338,605 A | 7/1982 | Mims | |
| 4,989,090 A | 1/1991 | Campbell et al. | |
| 5,479,176 A | 12/1995 | Zavrel, Jr. | |
| 5,583,884 A * | 12/1996 | Maruyama et al. | 375/143 |
| 5,892,847 A | 4/1999 | Johnson | |
| 5,933,537 A | 8/1999 | Hajjahmad et al. | |
| 6,101,399 A | 8/2000 | Raleigh et al. | |
| 6,185,440 B1 | 2/2001 | Barratt et al. | |
| 6,229,486 B1 | 5/2001 | Krile | |
| 6,317,612 B1 | 11/2001 | Farsakh | |
| 6,408,109 B1 | 6/2002 | Silver et al. | |
| 6,421,007 B1 | 7/2002 | Owen et al. | |
| 6,427,531 B1 | 8/2002 | Chintawongvanich | |
| 6,876,693 B2 | 4/2005 | Sim et al. | |
| 6,943,732 B2 | 9/2005 | Gottl et al. | |

(Continued)

OTHER PUBLICATIONS

International Search Report and Written Opinion issued by the U.S. Patent and Trademark Office for International Application No. PCT/US13/29613 mailed May 8, 2013 (8 pgs.).

(Continued)

*Primary Examiner* — Betsy Deppe
(74) *Attorney, Agent, or Firm* — Wilmer Cutler Pickering Hale and Dorr LLP

(57) ABSTRACT

In a direct sequence spread-spectrum (DSSS) systems, such as CDMA, information is encoded in symbols using phase shift keying or quadrature amplitude modulation. Further, a transmitter applied a selected time shifted lag to each symbol to convey additional information. A receiver detects both the symbol data and the lag value. The receiver can use a hermetic matched filter matrix to identify the lag.

19 Claims, 14 Drawing Sheets

(56) References Cited

U.S. PATENT DOCUMENTS

| | | | |
|---|---|---|---|
| 6,947,470 | B2 | 9/2005 | Berens et al. |
| 7,012,978 | B2 | 3/2006 | Talwar |
| 7,065,070 | B1 | 6/2006 | Chang |
| 7,092,690 | B2 | 8/2006 | Zancewicz |
| 7,103,537 | B2 | 9/2006 | Witzgall et al. |
| 7,106,785 | B2 | 9/2006 | Yoshida et al. |
| 7,260,370 | B2 | 8/2007 | Wang et al. |
| 7,280,627 | B2 | 10/2007 | Orlin |
| 7,298,805 | B2 | 11/2007 | Walton et al. |
| 7,415,711 | B2 | 8/2008 | Chew et al. |
| 7,443,942 | B2 * | 10/2008 | Kouyama ............ 375/376 |
| 7,450,067 | B2 | 11/2008 | Xin |
| 7,873,016 | B2 | 1/2011 | Kim |
| 7,925,234 | B2 | 4/2011 | Yeh et al. |
| 8,005,162 | B2 | 8/2011 | Cai et al. |
| 8,036,287 | B2 * | 10/2011 | Hwang et al. ............ 375/146 |
| 8,064,408 | B2 | 11/2011 | Woodsum |
| 8,433,804 | B2 | 4/2013 | Swanburg et al. |
| 2002/0034215 | A1 | 3/2002 | Inoue et al. |
| 2003/0039303 | A1 * | 2/2003 | Sriram ............ 375/147 |
| 2003/0216156 | A1 | 11/2003 | Chun |
| 2004/0071200 | A1 | 4/2004 | Betz et al. |
| 2004/0095990 | A1 | 5/2004 | Gossett et al. |
| 2004/0120429 | A1 | 6/2004 | Orlin |
| 2005/0101253 | A1 | 5/2005 | Pajukoski et al. |
| 2005/0128937 | A1 | 6/2005 | Akopian |
| 2005/0141545 | A1 | 6/2005 | Fein et al. |
| 2005/0200515 | A1 | 9/2005 | Cherniakov |
| 2005/0271016 | A1 | 12/2005 | Kim et al. |
| 2006/0030364 | A1 | 2/2006 | Olesen et al. |
| 2006/0053005 | A1 | 3/2006 | Gulati |
| 2006/0244660 | A1 | 11/2006 | Ann et al. |
| 2007/0001897 | A1 | 1/2007 | Alland |
| 2007/0164902 | A1 | 7/2007 | Bang et al. |
| 2007/0189362 | A1 | 8/2007 | D'Amico et al. |
| 2007/0213013 | A1 | 9/2007 | Kim |
| 2008/0260066 | A1 | 10/2008 | Cai et al. |
| 2008/0317172 | A1 | 12/2008 | Zhang et al. |
| 2009/0237294 | A1 | 9/2009 | Shoji et al. |
| 2009/0239551 | A1 | 9/2009 | Woodsum |
| 2010/0178057 | A1 | 7/2010 | Shieh |
| 2010/0254325 | A1 | 10/2010 | Narasimhan et al. |
| 2010/0272005 | A1 | 10/2010 | Larsson et al. |
| 2010/0303182 | A1 | 12/2010 | Daneshrad et al. |
| 2011/0188597 | A1 | 8/2011 | Agee et al. |
| 2011/0288823 | A1 | 11/2011 | Gupta |
| 2012/0027111 | A1 | 2/2012 | Vook et al. |
| 2012/0064916 | A1 | 3/2012 | Woodsum |
| 2012/0188058 | A1 | 7/2012 | Lee et al. |
| 2012/0212371 | A1 | 8/2012 | Chang |
| 2012/0262328 | A1 | 10/2012 | Shinonaga et al. |
| 2013/0252568 | A1 | 9/2013 | Woodsum |
| 2013/0344909 | A1 | 12/2013 | Davydov et al. |

OTHER PUBLICATIONS

International Search Report and Written Opinion issued by the U.S. Patent and Trademark Office for International Application No. PCT/US09/034264 mailed Apr. 23, 2009 (11 pgs.).

International Search Report and Written Opinion issued by the U.S. Patent and Trademark Office for International Application No. PCT/US13/53422 mailed Oct. 4, 2013 (7 pgs.).

Doblinger, G. "Beamforming with Optimized Interpolated Microphone Arrays," IEEE HSCMA Conference Proceedings, pp. 33-36 (2008).

Gabel and Roberts,"Signals and Linear Systems", 2nd Edition, John Wiley & Sons, New York, pp. 327-332, 345 (1980) (Total 9 pgs.).

Goshi, et al., "A Compact Digital Beamforming SMILE Array for Mobile Communications", IEEE Transactions on Microwave Theory and Techniques, vol. 52, No. 12 (Dec. 2004) 2732-2738 (7 pgs.).

Monzingo and Miller, "Introduction to Adaptive Arrays", John Wiley & Sons, p. 274 (1980) 217-292 (Total 78 pgs.).

Rao, C.R., "Estimation of Variance and Covariance Components in Linear Models," J. Stat. Assoc., Issue 337, Mar. 1972, pp. 112-115; Published online Apr. 5, 2012.

International Search Report and Written Opinion issued by the U.S. Patent and Trademark Office as International Searching Authority for International Application No. PCT/US14/62211 mailed Feb. 3, 2015 (8 pgs.).

International Search Report and Written Opinon issued by the U.S. Patent and Trademark Office as International Searching Authority for International Application No. PCT/US14/67148 mailed Jul. 31, 2015 (11 pgs.).

Zhang et al., "An oversampled filter bank multicarrier system for Cognitive Radio," IEEE 19th International Symposium on Personal, Indoor and Mobile Radio Communications, (PIMRC 2008) (5 Pages).

Koch et al., "Increased Capacity per Unit-Cost by Oversampling," IEEE 26th Convention of Electrical and Electronics Engineers in Israel pp. 1-27 (2010).

Pinchon et al., "A Design Technique for Oversampled Modulated Filter Banks and OFDM/QAM Modulations" Lecture Notes in Computer Science, vol. 3124, pp. 578-588 (2004).

Woodsum, C.M. and Woodsum, H.C., "Optimization of Cascaded Hermetic Transform Processing Architectures via a Chimerical Hybrid Genetic Algorithm," Proceedings of the Sixteenth International Conference on Cognitive and Neural Systems (ICCNS), Boston University, May 30-Jun. 1, 2012 (1 page).

* cited by examiner

DEVICES AND METHODS EMPLOYING HERMETIC TRANSFORMS FOR ENCODING AND DECODING DIGITAL INFORMATION IN SPREAD-SPECTRUM COMMUNICATIONS SYSTEMS

CROSS-REFERENCE

This application claims priority under 35 U.S.C. §119(e) to provisional application Ser. No. 61/895,577, filed Oct. 25, 2013, which is incorporated entirely by reference.

BACKGROUND

Communications systems employ various means of allowing multiple users to send data streams within an allocated portion of the communications frequency spectrum in a shared manner. These means include time-division multiple access (TDMA); frequency-division multiple access (FDMA); orthogonal frequency division multiplexing (OFDM), with carrier sense multiple access (CSMA); and code division multiple access (CDMA). Performance of these systems can be limited by the canonical algorithmic approaches for frequency spectral analysis and temporal correlation analysis/matched filtering.

Major advances in communications, especially related to cellular telephone systems, have been achieved as a result of spread-spectrum, Code Division Multiple Access (CDMA).

FIG. 1 shows a known generalized CDMA system for explanatory purposes. A binary information sequence of "1s" and "0s" (data bits) is converted to phase-shift forms, e.g., a "1" corresponds to no phase shift, and a "0" corresponds to a 180-degree phase shift. This is referred to as binary phase shift keying (BPSK), although other methods that use more phase shifts and multiple amplitudes, such as QPSK or QAM-64, could be used. These phase shifts can be applied with a particular keying rate to an intermediate frequency subcarrier signal. Next, orthogonal or quasi-orthogonal binary codes (e.g., Walsh Codes and/or Pseudo-Noise PN Codes) are applied in a similar fashion to channelize signals (especially via the Walsh code) and to spread the signal spectrally across a much wider bandwidth than the signal itself requires (e.g., 1.25 MHz for 3GPP2 specifications, and 5 MHz for 3GPP specifications). The signal is modulated onto a radio-frequency carrier signal, amplified, and fed to a transmitting antenna system. Each code is assigned to a different communications channel. With proper orthogonality of the codes, each channel can occupy the same frequency space 100% of the time and still be decoded and despread by receivers. At the receiving end, the RF carrier is demodulated and code correlated with a correlator or a matched filter to despread the signal, leaving an information sequence of 1's and −1's that are re-interpreted as binary ones and zeros. While shown with two steps of frequency conversion, often one step (direct conversion) is used from baseband to RF and vice versa.

Description

Direct sequence spread-spectrum (DSSS) systems, such as CDMA, can be used to encode and decode additional information and to increase the data-carrying capacity of such systems. In one example, it is shown that changes to the signaling scheme for CDMA allows significantly increased data rate performance through enhanced receive processing that can be performed with Hermetic Transforms. These transforms are described in more detail in U.S. Pat. No. 8,064,408, which is incorporated herein by reference.

Figure 1:
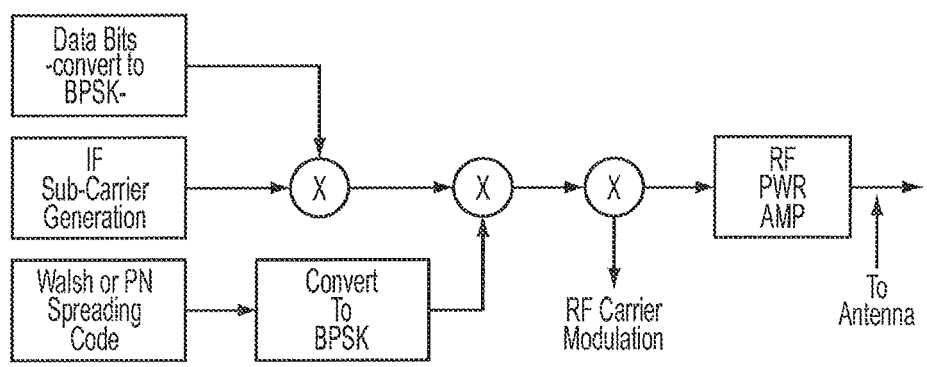
FIG. 1 is a block diagram of a known CDMA transmitter.
Figure 2:
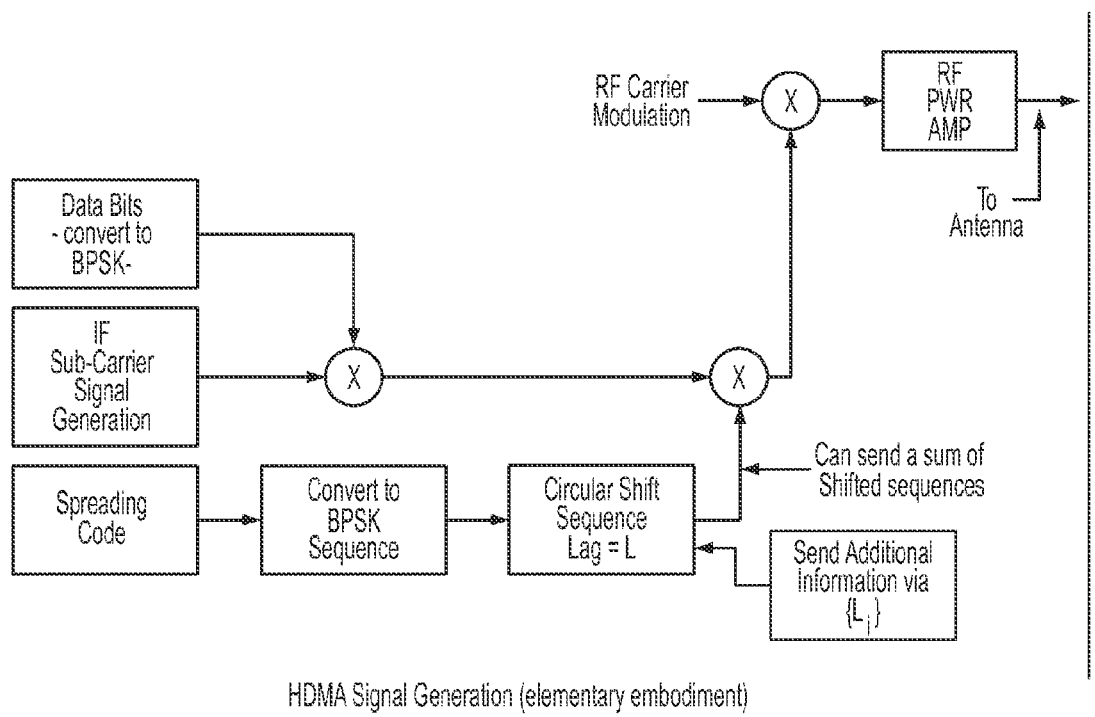
FIGS. 2-3 are block diagrams of a CDMA transmitter and receiver according to some embodiments.

Referring to FIG. 2, the present disclosure, referred to as Hermetic CDMA or "H-CDMA" uses a similar general approach to the known approach for transmitting with CDMA, but with modifications. A block diagram of the H-CDMA signal generation is shown in a manner that receives a signal from the process shown and described in conjunction with FIG. 1.

The H-CDMA utilizes the idea that code correlation using conventional convolution or FFT-based technology has a limit in time resolution which is on the order of the reciprocal of the spread signal bandwidth. For example, a 1 MHz wide spread signal will have a correlation peak on the order of one microsecond. Another idea that is exploited here is that for oversampled signals, use of Hermetic Transform Correlation or Hermetic Matched Filtering can allow higher temporal resolution, and that this resolution can be used for information-carrying.

Referring to FIG. 2, a digital form of a given coded signal, super-imposed on its sub-carrier, can be circularly shifted to transmit additional information via a circular shift sequence lag function to provide a sum of shifted sequences. A Hermetic Matched Filter (HMF) matrix (discussed in more detail below) maybe constructed to resolve circularly shifted versions of the given coded signal at the receiver end, and the shift information (lag) identified via a second stage of processing via the HMF processing stage. In other words, in addition to the "regular" information that would be transmitted with a CDMA transmitter, the transmitted signal can also have a lag that can be introduced and detected. This lag information can carry additional information as data. As mentioned with respect to FIG. 1, modulation other than BPSK can be used, and the signal could be directly upconverted.

Figure 3:
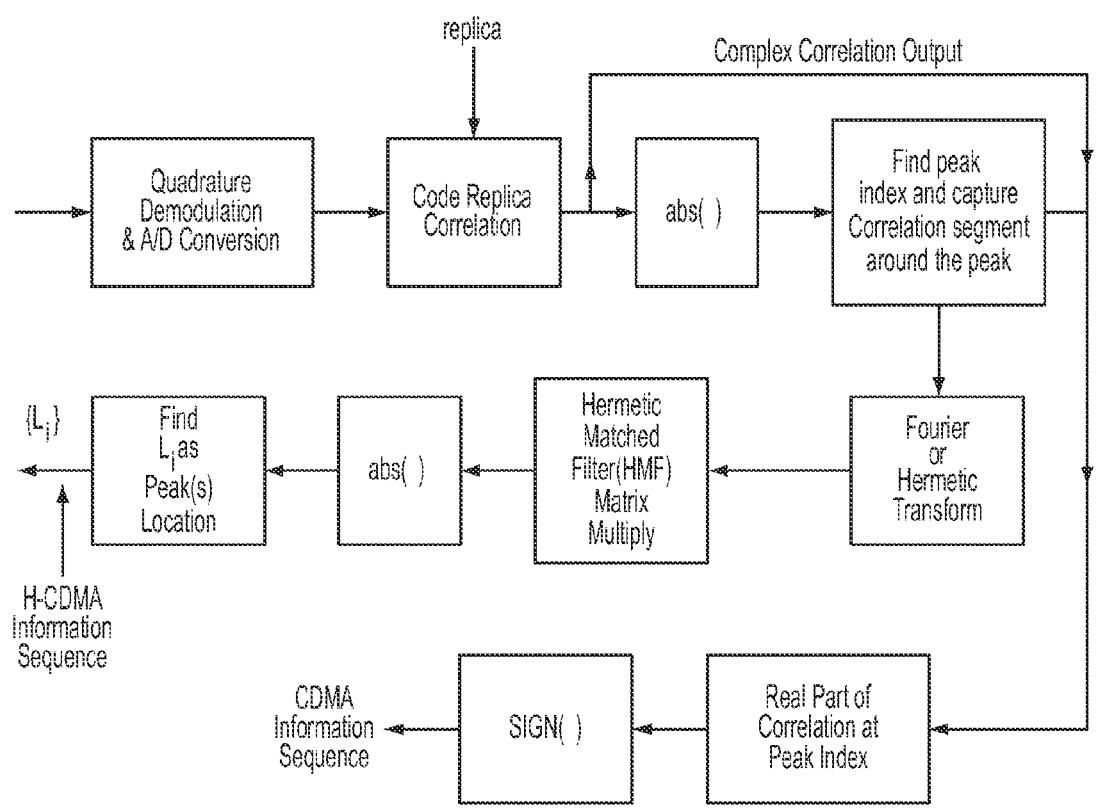

Referring to FIG. 3, the received data processing approach is shown in more detail. In this embodiment, the received signal is quadrature demodulated and analog-to-digital converted. A correlation process is performed on the digital signal with a replica (known and expected code) correlated against the received complex coded signal. The location of a code correlation peak determines an interval of the complex correlation function that can be utilized in the subsequent stages of processing. The complex correlation output is provided to a function that determines the real part at peak index. The SIGN function then receives the real part of the complex code correlation output at a lag corresponding to the peak correlation of the CDMA information bit stream (+/−1's). This is similar to a typical CDMA decoding process.

In additional, the receiver identifies a peak index and captures a correlation segment around the peak. The output is processed with a Fourier Transform or Hermetic Transform and then multiplied by the HMF matrix. The peak location of this result indicates the circular shift lag of the received signal. Multiple circularly shifted versions of the basic code can potentially be added together to send multiple lags as another layer of information.

Figure 4:
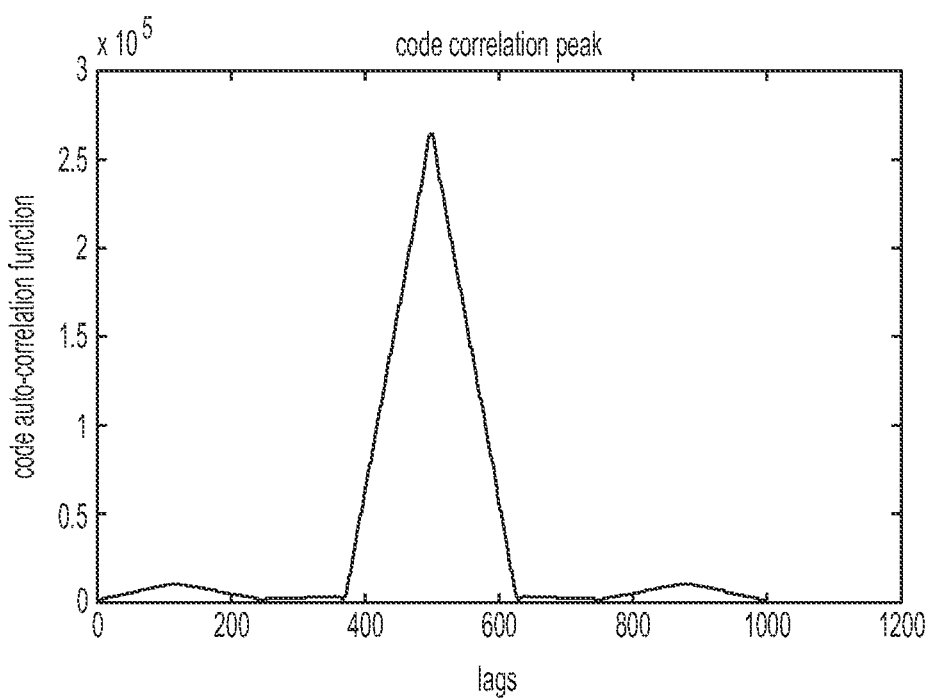
FIGS. 4-5 are graphs showing received signals according to some embodiments.

Referring to FIG. 4, a MATLAB™ experiment was done with a 5 MHz wide CDMA type signal (the bandwidth typically used in VMTS or W-CDMA), where a sampling rate is chosen to provide a correlation peak that is approximately 200 lags or samples wide. A set of circularly shifted versions of the CDMA codes were created with lags ranging from −50 to 50 samples relative to a center peak. The Hermetic Matched Filter was created so as to optimally separate these shifted codes and resolve them to recover data.

Figure 5:
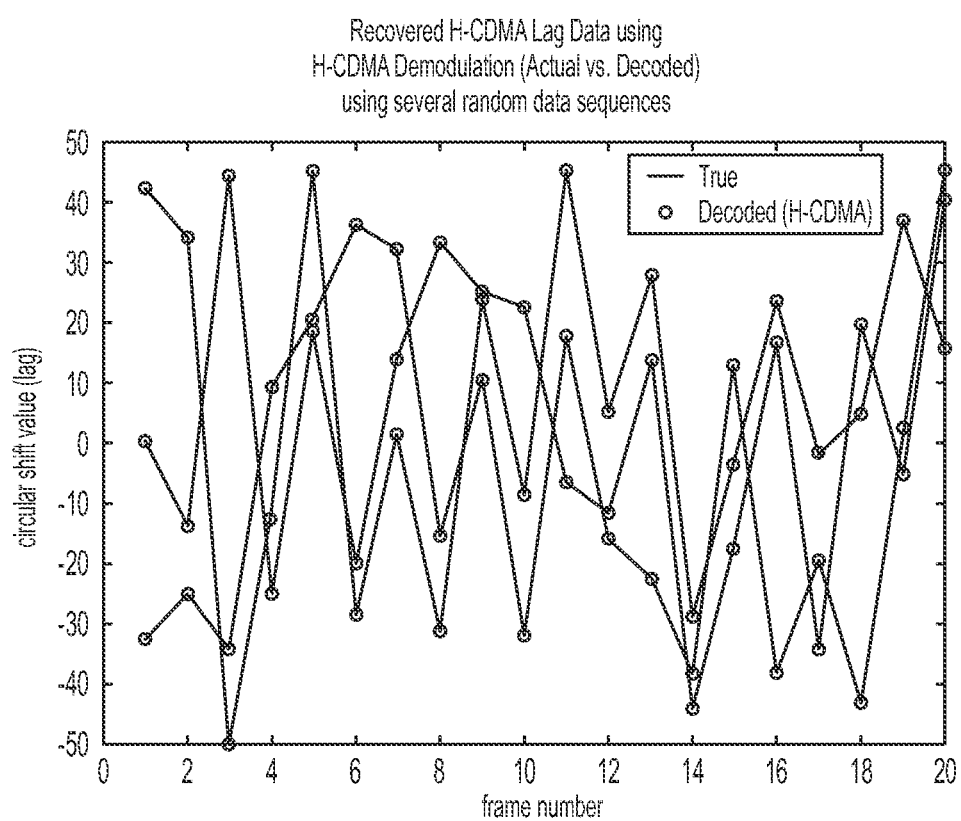

Referring to FIG. 5, each frame has a lag value. The results show the "sent lags" versus the "detected lags" for several ensembles of binary information. The figure indicates that the data was successful recovered. The result shows that 101 independent lag positions (from −50 to 50) corresponding to $\log_2(101)=6.7$ bits of additional information, can be sent, providing nearly an eight-fold improvement over conventional CDMA using BPSK. With additional oversampling and use of multiple sums of shifted replications, higher rates may be achieved. The concepts here also apply to the case of circular frequency shifting and use of ambiguity function time-frequency processing instead of correlation. In addition, amplitude and/or quadrature amplitude information might be impressed on each of the shifted codes so that even more information may be transmitted.

For a simplified example, suppose that each symbol has 4 bits of data (as with 16-QAM), and suppose there are 4 possible lags (rather than the 100 or more that is possible as noted above). This means that each symbol of 4 bits, combined with 2 bits that are detected from one of the 4 lags, can be used to encode 6 bits per symbol rather than 4 bits per symbol.

Hermetic Matched Filter

In H-CDMA, the performance at the receiver can be improved by using Hermetic-Transform Matched Filter (HTMF) correlation processing. As noted above, the concepts relating to Hermetic processing are described in the incorporated patent. Essentially, the conventional replica correlation used in code processing or replica matched-filter as used in conventional spread-spectrum systems is replaced with HTMF correlation. Gains accrue from both enhanced time-resolution in channel estimation, and in the potential update rate in channel estimation.

Figure 6:
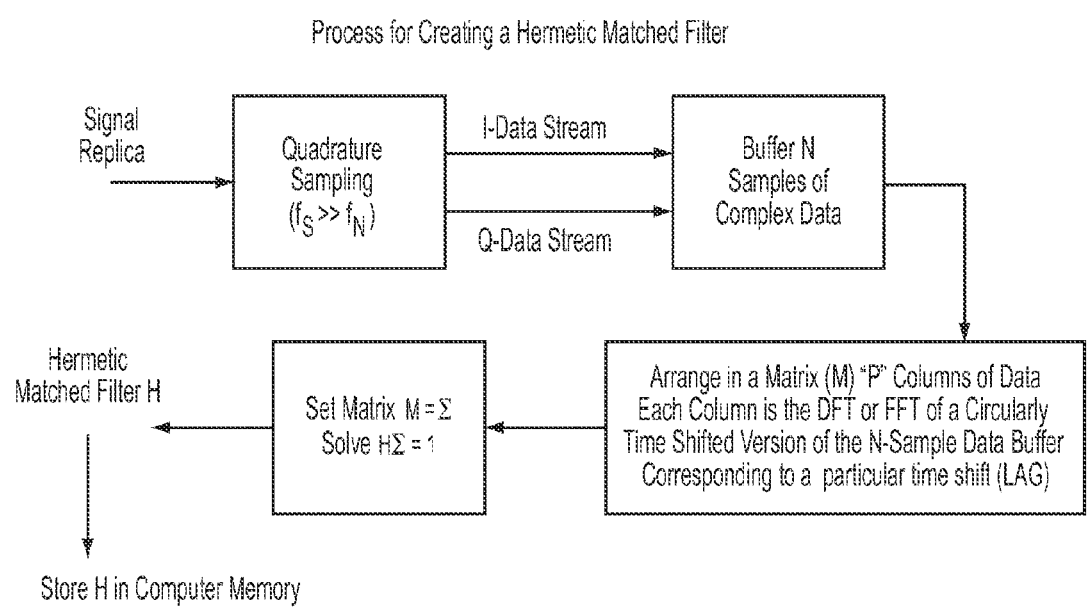
FIGS. 6-7 are block diagrams showing creation and use of a hermetic filter.

Referring to FIG. 6, the HTMF is created from the signal replica (the known code). The signal replica is assumed to be an array of complex-valued (c-number) time samples generated from a real-data derived from in-phase and quadrature sampling or via a Hilbert Transform. The signal is assumed to be band-limited. The replica is quadrature sampled at an oversampling rate $f_s$ that is significantly greater than the Nyquist rate, $f_N$. A plurality of vectors are produced by circularly shifting the signal vector by a particular number N of time samples (the "lags") and by applying a spectral transformation (FFT/DFT or Hermetic Transform). One vector is produced for each of N lag values, and these N samples are buffered. Each of these vectors is arranged as a column in a matrix referred to as a Signature Matrix (E). This matrix is then utilized to create a Hermetic Transform Matched Filter Matrix (H) which is constructed as the minimum quadratic norm solution to the matrix equation $H\Sigma=I$, where I is the identity matrix. The HMF matrix H is generated by a processing system and stored in memory.

Figure 7:
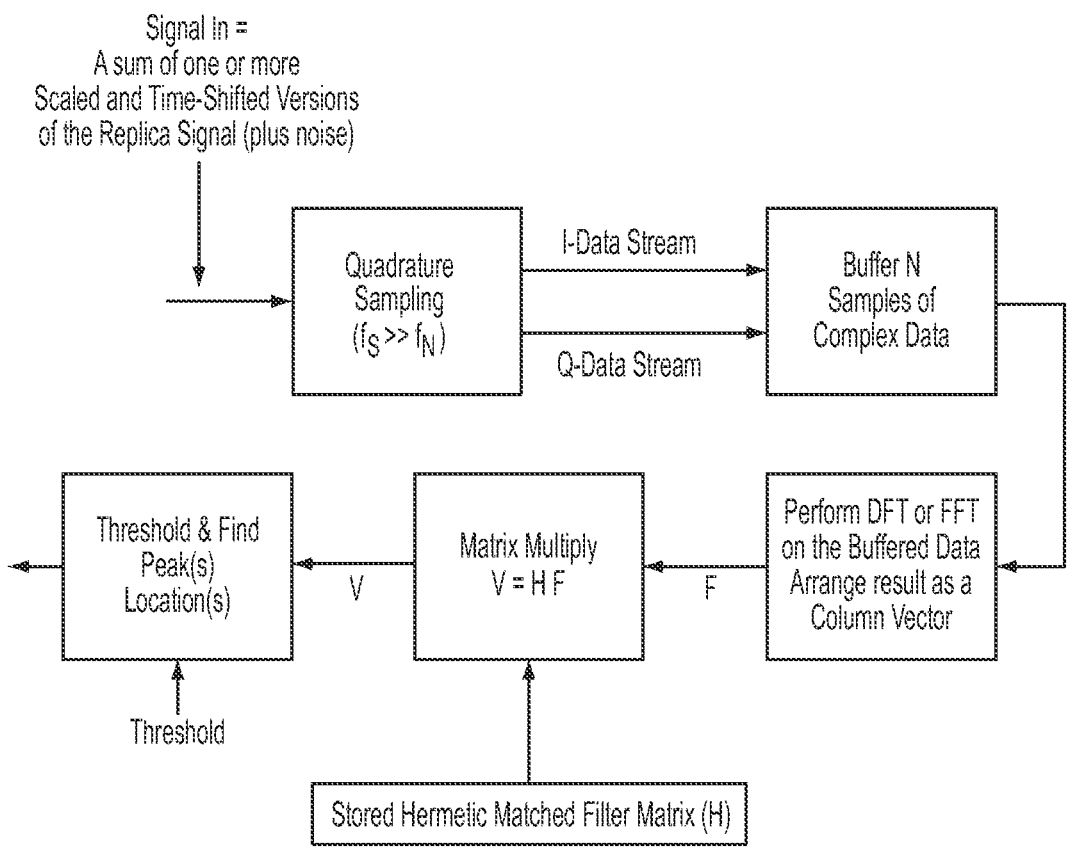

Referring to FIG. 7, in applying HTMF correlation to unknown signals at the receiver, it is assumed (as in conventional matched filtering) that the signal consists of the original replica changed only by a time-shift lag and amplitude scaling (channel gain). The HTMF is applied to the unknown signal (Signal In) after application of the same spectral transform (FFT/DFT or DHT) as was used in the creation of the Signature Matrix. A similar process of oversampling and buffering is performed. A transform is applied to the buffered data, and the result is arranged as a column vector F. This column vector is multiplied by the stored HMF matrix H.

If the input signal were precisely the same as a replica of the original signal with time lag L, application of the transform matrix H to vector F will produce a "1" in the Lth row of the column vector output V, and essentially zeroes everywhere else in the vector. The process is linear, so that a linear superposition of scaled time-lagged versions of the signal as an input will produce a corresponding linear superposition of output vectors. In the case of H-CDMA, the signal replica represents the spreading code or a version of the code that has been conventionally matched filtered. Any type of information sequence applied to this replica at the information signaling rate (e.g. BPSK/QPSK, QAM, etc.) will be preserved because of linearity of the HTMF process.

Lag-Division Multiplexing (LDM)

Still referring to FIG. 7, the last processing step shown (Threshold & Find Peak(s) Location(s)) provides an example of how the HTMF output can be used to detect the time lag in a signal as information. This process uses thresholding on the matched-filter output to determining peaks in the HTMF output.

Figure 8:
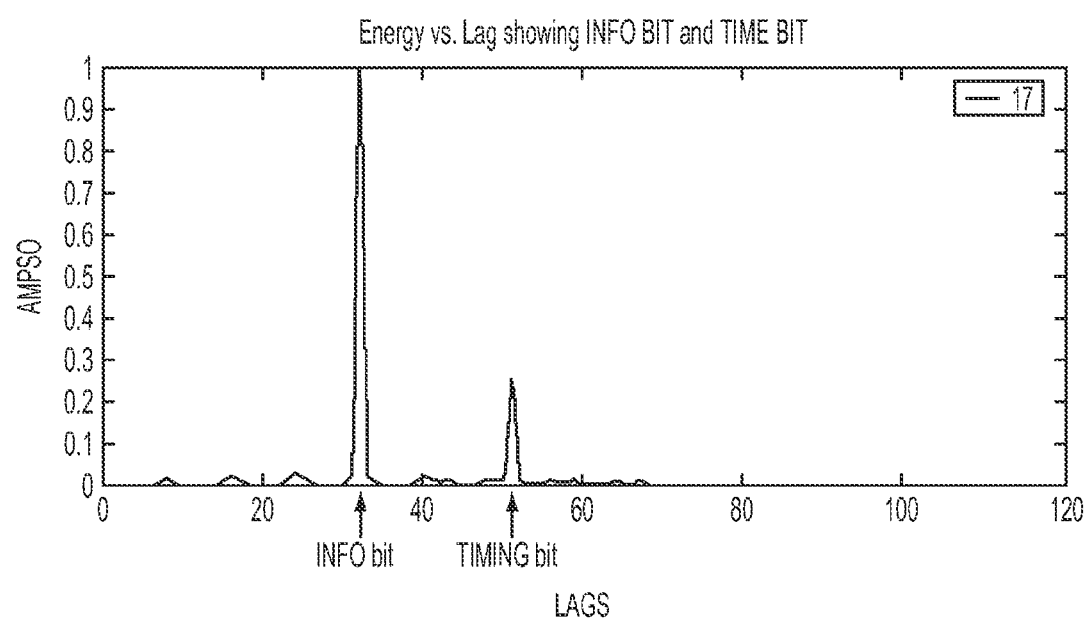
FIGS. 8 is a graph showing a timing bit.

Referring to FIG. 8, as an example of one embodiment, assume conventional replica correlation with the spreading code produces an output as shown. A conventional matched filter produces a broad peak in time, shown here as the INFO bit, which is on the order of approximately 1/W seconds in time, where W is the spread bandwidth of signal (e.g., a CDMA signal).

Figure 9:
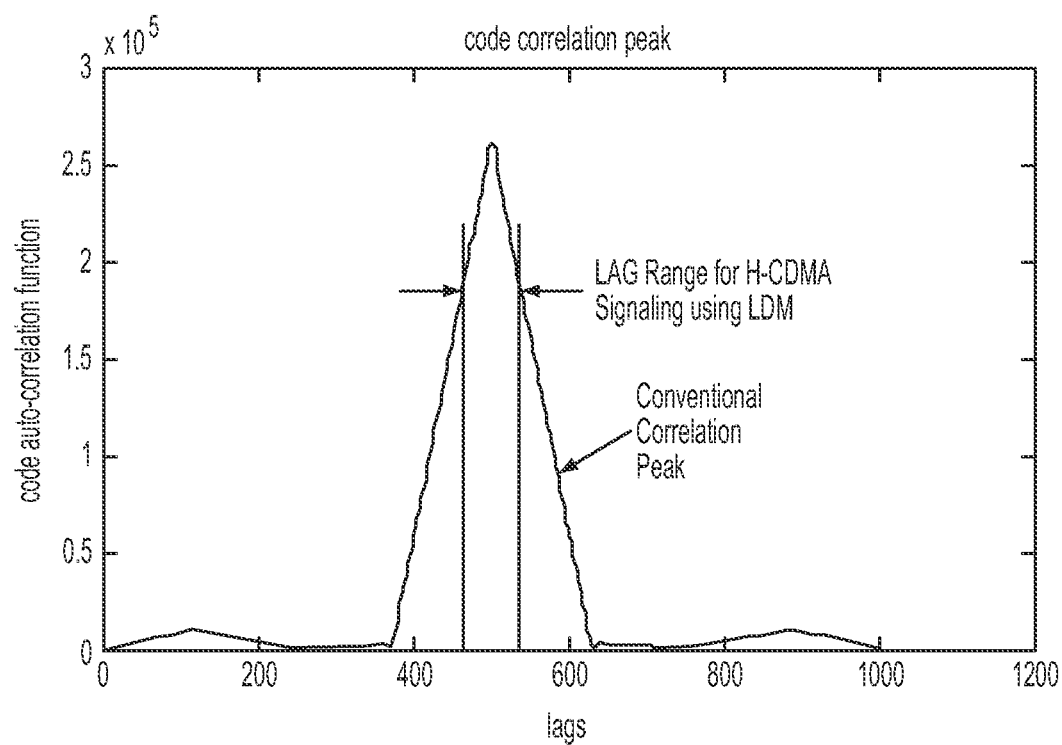
FIGS. 9-11 are graphs of examples of received signals.

Referring to FIG. 9 (which is similar to FIG. 4), a range of lags is selected to lie within the main lobe of the correlation peak as shown. For purposes of illustration, lags from −50 samples to 50 samples have been selected, and therefore there are 101 possible lag positions. One or more of these signals can be transmitted in each frame. Assume a single lagged version of the signal is transmitted out of 100 possible positions for a total of $\log_2(100)$ bits of additional information being transmitted by shifting the replica. A conventional CDMA correlator might typically be unable to identify such small time shifts due to the approximately 1/W time resolution limit on replica correlation, but the HTMF correlation can detect the lag with more precision.

Referring again to FIG. 8, in one embodiment, the zero-lag version of the signal is reserved as a synchronization/TIMING bit and for use in multi-path channel response estimation. Therefore, each frame represents the sum of a zero-lag version of the code plus a non-zero lag version (INFO bit) of the code. The figure indicates the 101 positions from lags −50 to 50 (or shown as 0 to 100) samples on the x-axis and the output represents the amplitude of the HTMF output. The zero-lag code correlation peak from the HTMF shown as TIMING bit lies in the middle of the frame, while the non-zero lag peak, INFO bit, is also clearly seen. Different amplitudes have been used for presentation purposes. The peak with smaller amplitude is the "synch" signal (zero-lag) while the location of the larger peak provides additional bits of information through its position relative to the zero-lag location, rather like pulse-position modulation. In FIG. 7, the distance between the INFO bit and the TIMING bit is approximately 20 lags/samples, but it is determined precisely to recover information. This is referred to here as Lag-Division Multiplexing (LDM).

The system can use 2, 4, 8, 16, 32, 64, etc., lags to transmit 1, 2, 3, 4, 5, 6, etc., bits of data.

Hermetic RAKE Receiver (HRR) and Hermetic Equalizer Processing

It is often the case, for example in a cellular telephone application (but not limited to such an application), that the signal received at the handset is related in a complex manner to the transmitted signal. In particular, the signal may have propagated from the base station (transmitting point) to the handset (receiving point) along several paths, each of which may have introduced additional amplitude, phase, and time delay modification to the signal. The use of signal diversity processing is common in order to gain signal to noise ratio and to avoid bit errors. In the case of the H-CDMA type processing, the success of utilizing lagged versions of the signal code could be disrupted without compensation for channel corruption. The Hermetic Transform Matched Filter assists with this problem.

A traditional RAKE architecture used in receivers can be modified applying HTMF correlation as a replacement for conventional correlation in channel estimation, in order to derive parameters for either a RAKE receiver or equalizer (or both). This process creates two categories of improvement, namely (1) improved multipath time delay estimation, and therefore better channel estimation; and (2) potential use of smaller data blocks for estimation, and therefore better ability to adapt to changes of channel conditions in mobile or other non-stationary statistics condition.

Channel Estimation and RAKE Processing using Hermetic Transform Matched Filter

The present disclosure accomplishes diversity processing using one or more antennas to accomplish RAKE processing. Channel estimation is accomplished by applying the HTMF to a known "probe signal" which can be constructed and used especially for this purpose, or alternatively, the series of "synch" (zero-lag) codes embedded in every frame of data can be utilized to determine the channel model parameters used in the RAKE receiver.

A model and diagram for conventional RAKE receiver processing used as one embodiment is taught by Proakis, "Digital Communications" (McGraw Hill, 1983, p. 471). The model is that of a tapped delay line of Finite Impulse Response (FIR) form with complex weights and delays corresponding to the unknown channel. An optimum form of RAKE correlator is derived for this model in the reference, for the case where the tap weights are known, and the tap spacing is determined by the time resolution of the matched filter correlator (tap spacing=approximately 1/W). The architecture shown in the text book need only be modified, i.e., the tap delays are reduced to accommodate the much higher time resolution of the HTMF, and channel estimation uses HTMF instead of replica correlation.

Figure 10:
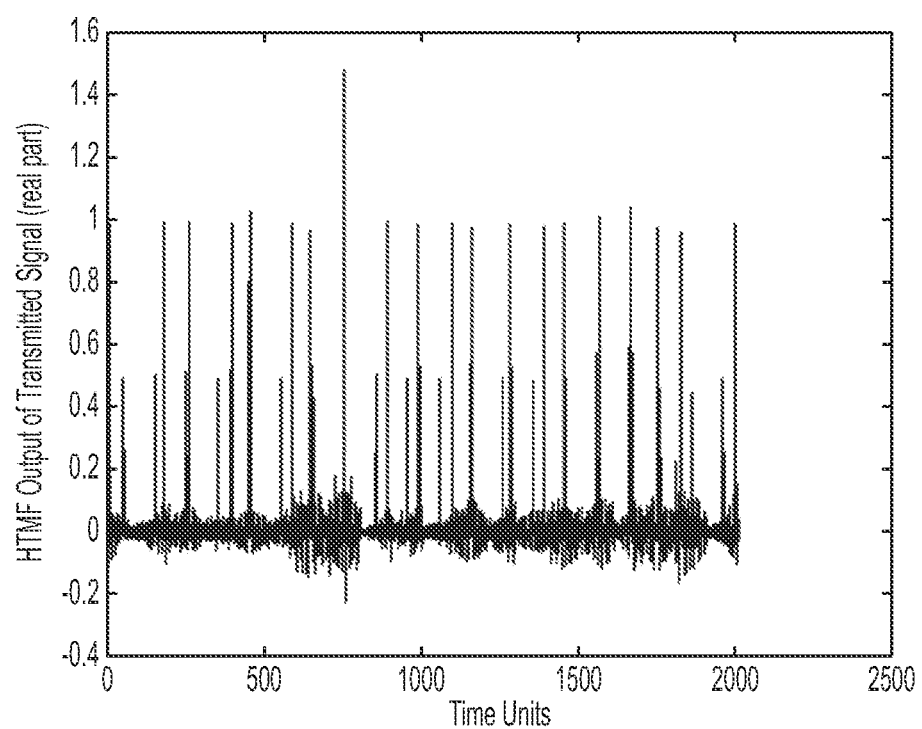

FIG. 10 shows HTMF output versus time with a real part of a random calibration signal sequence processed with the HTMF. The "spikes" in the HTMF output correspond to coded signals with various lags.

Figure 11:
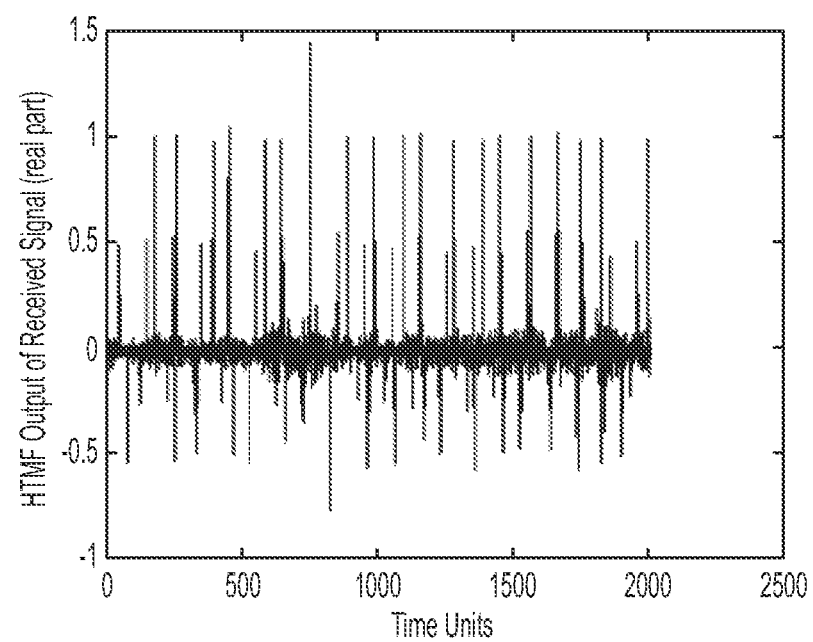

FIG. 11 shows the output of a channel-corrupted version of this sequence processed with the identical HTMF. These signals are input to a channel estimation model constrained to be of the FIR form. The channel model can use a simplistic model, two paths with one path having unity gain and one delayed by 75 samples (marginally detectable using conventional correlation processing) with a gain of 0.5 and a 180 degree phase shift. Thus all of the tap weights are zero except for the zero-lag and the 75-sample lag terms.

The channel estimator used was the Steiglitz-McBride Iteration (part of the standard MATLAB™ Signal Processing Toolbox). The routine takes the input sequence and output sequences and form these moving-average (FIR) and auto-regressive (AR) filter coefficients. The number of AR coefficients was set to zero and the result is an FIR, tapped-delay model. The channel estimation is shown in FIG. 11, with amplitude and phase of the weights precisely correct. There are a variety of algorithms which can be used for this part of the process, which are familiar to one with ordinary skill in the art. Alternatively, the channel response could be used to create an inverse filter, which then could be used to equalize the signal and remove channel effects; this approach is less common but not always infeasible.

Figure 12:
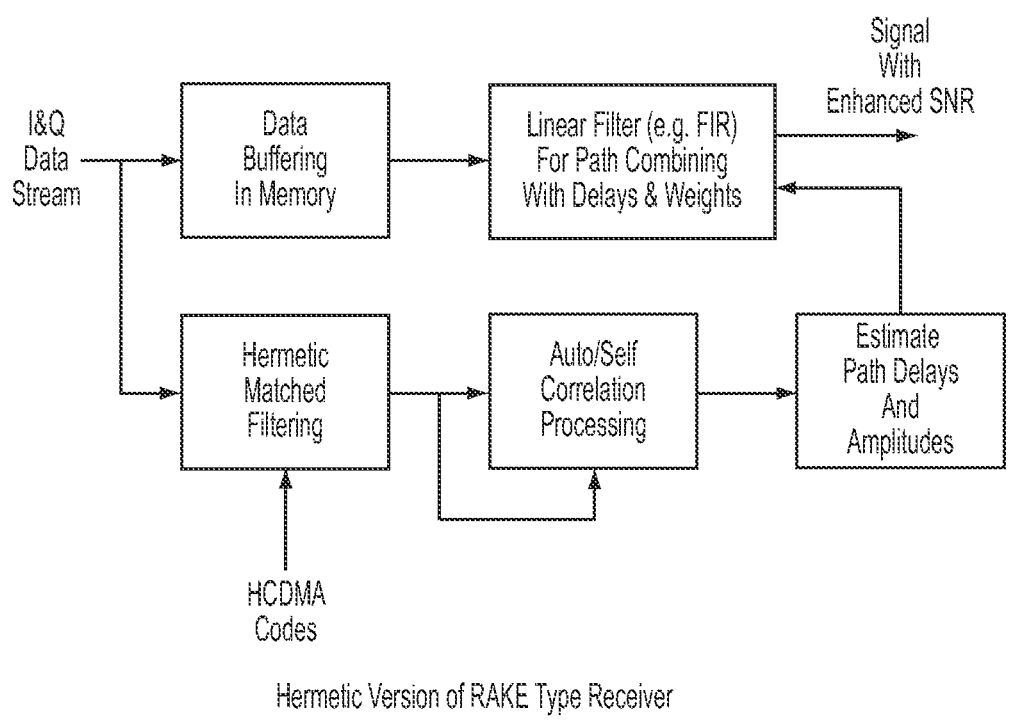
FIG. 12 is a block diagram of a RAKE receiver.

FIG. 12 shows a block diagram of a Hermetic version of a RAKE receiver. The received signal is split in two paths—one to a data buffer and then linear filter to provide an output signal with improved SNR. In the other path, the signal is provided to a HMF path for estimating path delays and amplitudes to adjust the linear filter.

Figure 13:
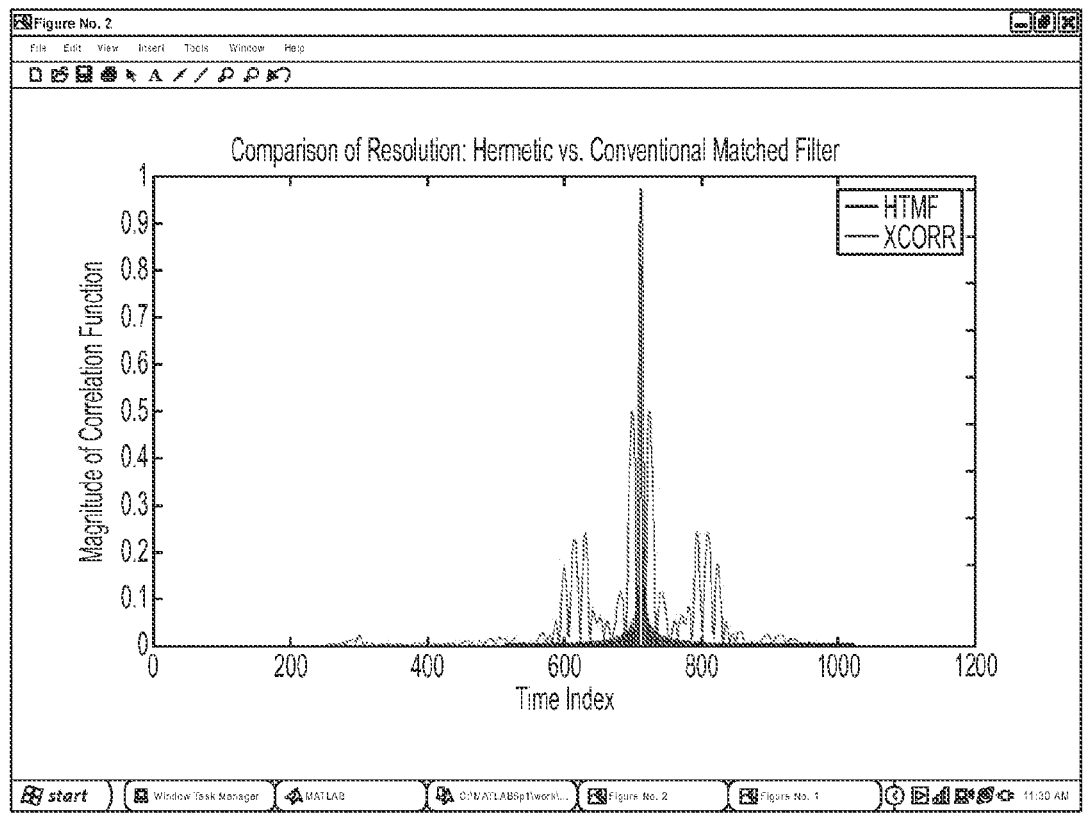
FIGS. 13-14 are graphs of received signals.
Figure 14:
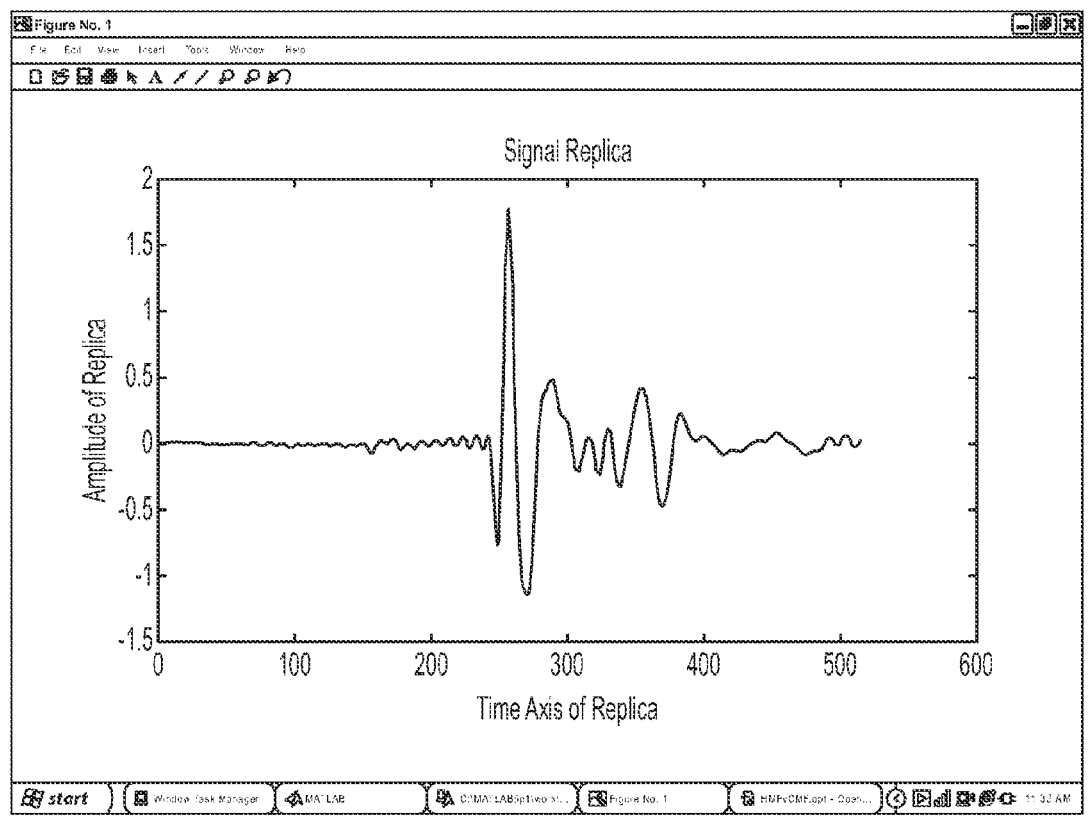

FIGS. 13 and 14 are examples of real data of a pulsed signal (shown as replica), which is being "replica correlated" or equivalently "matched-filtered" using the HMF versus a conventional matched filter, and shows a resolution enhancement.

Other embodiments are within the following claims. The inventions described here include the ability to add time lag information to a signal to enhance the amount of data carrier, and particularly to a DSSS signal, and more particularly with a Hermetic matched filter. The systems and methods can be used for CDM and CDMA systems, including for mobile terminals and base stations (including access points). As indicated in the incorporated patent, the implementation can be made with any form of suitable processor, including general or specific purpose processors, including processing logic, and would typically be in a system that includes memory and other associated processing. In a communications system, the implementation would typically reside in the MAC/PHY layers, and could be implemented with hardware or software logic.

What is claimed is:

1. A receiver method comprising:
   receiving a direct sequence spread spectrum (DSSS) signal with a combination of data symbols and a code;
   deriving data from the data symbols;
   determining one of a plurality of different time-shifted lag values of the received code relative to a known reference value;
   deriving encoded data based on the lag value;
   outputting data derived from both the data symbols and from the lag value,
   wherein determining the lag value includes generating a plurality of vectors by shifting an input signal vector by a number N of time samples and applying a transform to produce a transformed signal; and
   wherein determining the lag value further includes providing the transformed signal to a hermetic matched filter matrix to produce a hermetic matched filtered signal.

2. The method of claim 1, wherein receiving the direct sequence spread spectrum signal with a combination of data symbols and a code includes oversampling the received signal.

3. The method of claim 1, wherein the receiving includes quadrature demodulating and converting a received analog signal to a digital signal.

4. The method of claim 1, wherein each symbol represents n bits, and wherein the lag value represents m bits, such that a lagged symbol represents n+m bits.

5. The method of claim 1, wherein the DSSS signal is received by a mobile device.

6. The method of claim 1, wherein the DSSS signal is received by a base station.

7. The method of claim 1, wherein the receiving includes receiving symbols encoded with phase shift keying (PSK) or quadrature amplitude modulation (QAM).

8. The method of claim 1, wherein determining the lag value includes determining one of at least 4 values, and determining encoded data includes deriving at least two bits from the lag value.

9. A receiver comprising an antenna for receiving RF signals:
    memory for storing instructions; and
    a processor for executing instructions, the receiver configured for: receiving a direct sequence spread spectrum (DSSS) signal with a combination of data symbols and a code;
        deriving data from the data symbols;
        determining one of a plurality of different time-shifted lag values of the received code relative to a known reference value;
        deriving encoded data based on the lag value;
        outputting data derived from both the data symbols and from the lag value,
    wherein determining the lag value includes generating a plurality of vectors by shifting an input signal vector by a number N of time samples and applying a transform to produce a transformed signal; and
    wherein determining the lag value further includes providing the transformed signal to a hermetic matched filter matrix to produce a hermetic matched filtered signal.

10. The receiver of claim 9, wherein the receiver is part of a mobile device.

11. The receiver of claim 9, wherein the receiver is part of a base station.

12. The receiver of claim 9, wherein receiving the direct sequence spread spectrum signal with a combination of data symbols and a code includes oversampling the received signal.

13. A transmitter method comprising:
    encoding data as symbols;
    applying one of a plurality of possible sequence lag values to a spreading code to create a time-shifted spreading code relative to a reference value, wherein the lag value represents coded data;
    combining the time-shifted spreading code and symbols to produce a spread spectrum signal that combines the symbols with the code at the applied lag value, where a spacing between lag values is less than 1 divided by a bandwidth of the spread spectrum signal; and
    transmitting the combined signal to provide a signal including data represented by encoded symbols and data represented by the lag value.

14. The method of claim 13, wherein the data symbols represent one of phase shift keyed data and quadrature amplitude modulated data.

15. The method of claim 14, wherein the data symbol represent a number of bits n, and the lag value encodes a number of bits m, such that each lagged symbol represents n+m bits.

16. The method of claim 15, wherein the transmitting is performed by a mobile device.

17. The method of claim 13, wherein the transmitting is performed by a base station.

18. The method of claim 13, wherein, the applying includes applying one of four lag values.

19. The method of claim 18, wherein the lag value encodes at least two bits per symbol.

* * * * *